US012311694B2

(12) United States Patent
Rajasekhar et al.

(10) Patent No.: US 12,311,694 B2
(45) Date of Patent: May 27, 2025

(54) WRITING INSTRUMENT

(71) Applicant: Sanford L.P., Atlanta, GA (US)

(72) Inventors: Venkata Rajasekhar, Chennai (IN); Sivanpillai Murugan, Chennai (IN); Ramaswamy Kaleesvaran, Chennai (IN)

(73) Assignee: Sanford, L.P., Atlanta, GA (US)

(*) Notice: Subject to any disclaimer, the term of this patent is extended or adjusted under 35 U.S.C. 154(b) by 0 days.

(21) Appl. No.: 17/663,655

(22) Filed: May 16, 2022

(65) Prior Publication Data

US 2022/0371356 A1 Nov. 24, 2022

(30) Foreign Application Priority Data

May 19, 2021 (IN) ............................ 202111022407

(51) Int. Cl.
*B43K 1/08* (2006.01)
*B43K 7/10* (2006.01)

(52) U.S. Cl.
CPC .............. *B43K 1/086* (2013.01); *B43K 1/082* (2013.01); *B43K 7/10* (2013.01)

(58) Field of Classification Search
CPC ........... B43K 1/086; B43K 1/088; B43K 7/01
See application file for complete search history.

(56) References Cited

U.S. PATENT DOCUMENTS 5,551,789 A * 9/1996 Okawa ..................... B43K 8/08 401/199
6,261,019 B1 7/2001 Furukawa
6,398,442 B1 6/2002 Furukawa
6,582,144 B1 6/2003 Matsumoto et al.
6,755,587 B2 * 6/2004 Fukushima .............. B43K 7/10 401/214
7,600,938 B2 * 10/2009 Kobayashi ............. C09D 10/00 401/214
9,969,205 B2 * 5/2018 Kawasaki ................ B43K 8/08
10,836,204 B1 11/2020 Jar
(Continued)

FOREIGN PATENT DOCUMENTS

CH 702219 B1 * 5/2011 ............. B43K 1/086
CN 109203763 A 1/2019
(Continued)

OTHER PUBLICATIONS

EPO, "Extended European Search Report" Application No. 22173939.4, mailed Sep. 19, 2022, 7 pages.
(Continued)

*Primary Examiner* — David P Angwin
*Assistant Examiner* — Bradley S Oliver
(74) *Attorney, Agent, or Firm* — Eversheds Sutherland (US) LLP

(57) ABSTRACT

A writing tip assembly for dispensing a free-flowing low-viscosity ink from a writing instrument may include a micro-spring, a writing ball configured to transfer ink to a substrate, and a second ball between the writing ball and the micro-spring. The second ball is configured to transfer ink to the writing ball. A writing instrument for dispensing a free-flowing low-viscosity ink includes an ink reservoir, the writing tip assembly, and a feeder fluidically coupling the ink reservoir to the writing tip assembly.

18 Claims, 5 Drawing Sheets

(56) References Cited

U.S. PATENT DOCUMENTS

| | | | | |
|---|---|---|---|---|
| 2005/0019090 A1* | 1/2005 | Takasu | B43K 7/08 | |
| | | | 401/214 | |
| 2022/0251406 A1* | 8/2022 | Masushige | B43K 7/02 | |

FOREIGN PATENT DOCUMENTS

| | | | | | |
|---|---|---|---|---|---|
| CN | 209063751 | U | | 7/2019 | |
| EP | 2062744 | A1 | | 5/2009 | |
| EP | 2546071 | A1 | | 1/2013 | |
| FR | 2779991 | A1 | | 12/1999 | |
| KR | 200240694 | Y1 | | 10/2001 | |
| KR | 101794057 | B1 | * | 11/2017 | B43K 1/088 |

OTHER PUBLICATIONS

Pilot, "Precise V5 Rollerball Pens, Extra Fine Point" https://www.staples.com/Pilot-Precise-V5-Extra-Fine-Point-Premium-Rolling-Ball-Stick-Pens-0-5-mm-Black-12-Pack-35334/product_205112, Accessed Sep. 28, 2022, 1 page.

Pilot, "Presise V7 Rollerball Pens, Fine Point" https://www.staples.com/Pilot-Precise-V7-Premium-Rolling-Ball-Stick-Pens-Fine-Point-Black-12-Pack-35346/product_205138, Accessed Sep. 28, 2022, 1 page.

Uniball, "Who we are—Our history: The Retractable Uni-Ball Signo" https://www.uniballfrance.eu/who-we-are) , Accessed Sep. 29, 2022, 1 page.

Sharpie, "Rollerball Pen, Needle Point" https://www.officedepot.com/a/products/8984202/Sharpie-Rollerball-Pen-Needle-Point-05mm/, Accessed Sep. 28, 2022, 1 page.

Reynolds, "Trimax 0.7mm Arrow Tip Smoot Roller Pens" https://www.amazon.com/Reynolds-Trimax-0-7mm-Arrow-Roller/dp/B07WRZN7GN, Accessed Sep. 28, 2022, 1 page.

* cited by examiner

WRITING INSTRUMENT

CROSS-REFERENCE TO RELATED APPLICATIONS

This application claims priority to Indian Provisional Specification No. 202111022407, filed May 19, 2021, which is incorporated herein in its entirety by reference.

TECHNICAL FIELD

The present disclosure relates generally to writing instruments, for example, writing instruments including writing tip assemblies for dispensing free flowing ink.

BACKGROUND

One type of conventional writing instruments includes oil or gel-based ball-point pens, the viscosity of the ink used is around 300 to 10,000 mPa-s, which is relatively higher in order to avoid front tip leakage or back leakage issues. The high viscosity prevents leakage at different environmental conditions. To avoid leakage, the viscosity of the ink is maintained sufficiently high and thinner inks may be avoided. While gel-pens may include a spring associated with a writing tip, no feeder system or pressure regulation components are present. The only ink transfer member is the tip, with direct contact between the ink reservoir and the tip. The spring has a single coil diameter thorough its length except for the front and rear position. Such springs do not act as an ink transfer member, and may only control leaks at extreme environment conditions. The spring is not in contact with other elements other than the tip body.

Another type of conventional writing instruments use significantly thinner inks, for example, free flowing inks having low viscosities such as 1.5 to 60 mPa-s at standard temperature and pressure (STP) conditions. To control the discharge of the ink, a feeder is used, which includes a bundle of fibers packed together. The feeder allows the ink to be guided along a longitudinal direction to the tip from an ink reservoir. However, the free-flow system pen does not completely control the amount of ink flow/discharge. After certain meters of writing, the ink flow starts to diminish. This results in poor writing performance of the ink. The ink flow/discharge can be improved by weakening the capillary force. However, blow-out phenomenon may occur, where the ink leaks from the tip or through the lamella.

The blow-out phenomenon generally occurs when the outside pressure of the environment reduces. Other cases where the phenomenon may occur is with a decrease in ambient temperature, an increase in the pen temperature or an increase of the pressure within the free flow system pen. For example, this phenomenon may occur while travelling in aircraft such as planes. At greater altitudes, the atmospheric pressure drops. It drops to 0.3 bar at an altitude of 10000 m above the seal level at 15° C. and 0% Humidity. In such conditions, due the vast pressure difference present between the outside atmosphere and free flow system pen, the blow-out phenomenon occurs.

As per kinetic theory of gases, the viscosity and surface tension decrease in liquids when the temperature of the liquid rises. Thus, the tendency of blow-out phenomenon will be most likely in tropical or dry zones where the temperature varies and rises to an extremum of 50° C. At such conditions, leakage may occur via the lamella/collector air inlet and tip point leakage.

A need remains for writing instruments that exhibit controlled dispensing of ink and with reduced, controlled, minimal, or substantially no leakage.

SUMMARY

The present disclosure describes writing tip assemblies and writing instruments including writing tip assemblies.

In aspects, the present disclosure describes a writing tip assembly for dispensing a free-flowing low-viscosity ink from a writing instrument. The writing tip assembly includes a micro-spring, a writing ball configured to transfer ink to a substrate, and a second ball between the writing ball and the micro-spring. The second ball is configured to transfer ink to the writing ball.

In aspects, the present disclosure describes a writing instrument for dispensing a free-flowing low-viscosity ink. The writing instrument includes an ink reservoir, the writing tip assembly, and a feeder fluidically coupling the ink reservoir to the writing tip assembly.

DETAILED DESCRIPTION

Figure 1:
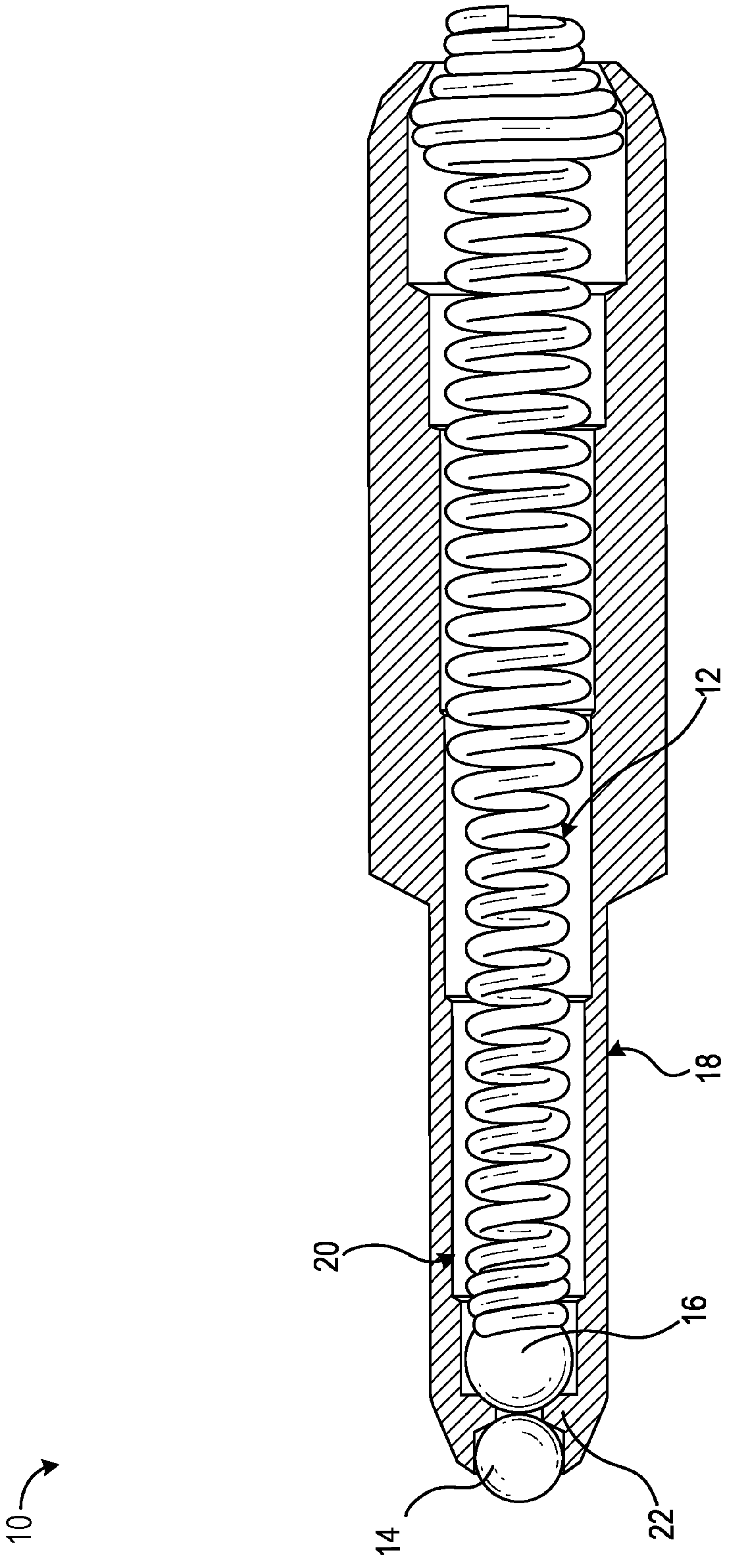
FIG. 1 is a conceptual cross-sectional view showing a writing tip assembly.

The present disclosure describes writing tip assemblies and writing instruments including writing tip assemblies. Writing tip assemblies and writing instruments according to the disclosure may exhibit reduced or substantially no leakage under typical ambient conditions. Writing tip assemblies and writing instruments according to the disclosure may also provide relatively smooth writing by promoting uniform flow of ink.

Leakage through lamella air inlet may be termed as lamella leak, and may be controlled by providing enough space for the ink to occupy in the ink reserve groove and by increasing the number of circumferential fins. Leakage through the tip point may be controlled conventionally by reducing the ball rotation area, otherwise termed as ball play.

Conventionally, the ink is directly transferred to the writing tip or ball by a feeder or by any means, using capillary action. If the ball play is higher, the ink transfer will also be higher and vice versa. However, increasing the gap or ball play increases the risk of leakage. The lesser the ball play, lesser the ink transfer from the tip to the paper. Conventional ballpoint free flow pens may not be able to sufficiently control leakage via the tip writing ball when subjected to hot and humid environment conditions.

Blow-out phenomenon may eventually occur at very low pressures in conventional ballpoint free flow pens from the writing ball, because of the lesser resistance offered by the ink, where the force exerted by the viscosity of the fluid is overcome by the pressure differential. Thus, conventional free flow pens may exhibit tip point leakage irrespective of the pressure regulation performed by the collector/lamella inside the ink reservoir.

Thus, in free-flow system ink pens, water-based ink may be preferred because of its low viscosity and good surface tension characteristics. It ensures continuous feeding and proper ink discharge through the feeder. However, lower viscous ink may not provide good lubrication and may be susceptible to leakage. The free flow system utilizes the concept of capillary action, where the ink flows to the tip via the feeder (porous body with directional fibers). In conventional free flow systems, ink may be transferred to the tip either by direct contact with the surface of a feeder, or with the assistance of a plastic broach.

In aspects, the present disclosure describes a writing tip assembly for dispensing a free-flowing low-viscosity ink from a writing instrument. The writing tip assembly includes a micro-spring, a writing ball configured to transfer ink to a substrate, and a second ball between the writing ball and the micro-spring. The second ball is configured to transfer ink to the writing ball.

In aspects, the present disclosure describes a writing instrument for dispensing a free-flowing low-viscosity ink. The writing instrument includes an ink reservoir, the writing tip assembly, and a feeder fluidically coupling the ink reservoir to the writing tip assembly.

Writing instruments according to the present disclosure may use a low-viscosity ink and a free-flow system. Writing tip assemblies may include a double-ball and a micro-spring to promote ink flow and control while reducing or preventing leakage. The ink discharge may be controlled by both the double ball micro-spring tip and a lamella (or collector). Pressure regulation may be performed by the lamella. A feeder may be used to transfer ink to the tip assembly via capillary action of the ink. The micro-spring also may acts as an ink-guiding member due to the negligible or very low pitch between coils of the micro-spring in the assembled tip. In some aspects, writing instruments according to the present disclosure use indirect ink transfer type—with no direct contact of the tip assembly with the ink reservoir. The micro-spring may contact the feeder to receive ink and enhance the fluid flow characteristics.

FIG. 1 is a conceptual cross-sectional view showing a writing tip assembly 10. The writing tip assembly 10 may be used for dispensing a free-flowing low-viscosity ink from a writing instrument (not shown in FIG. 1). The writing tip assembly 10 includes a micro-spring 12, a writing ball 14 configured to transfer ink to a substrate, and a second ball 16 between the writing ball 14 and the micro-spring 12. The second ball 16 is configured to transfer ink to the writing ball 14.

In aspects, the second ball 16 has a diameter greater than that of the writing ball 14. Providing such a greater diameter to the second ball 16 may promote retention of the second ball 16 against the writing ball 14 when biased by the micro-spring 12 and/or may promote a relatively greater transfer of ink to the writing ball 14 across the second ball 16.

Figure 2:
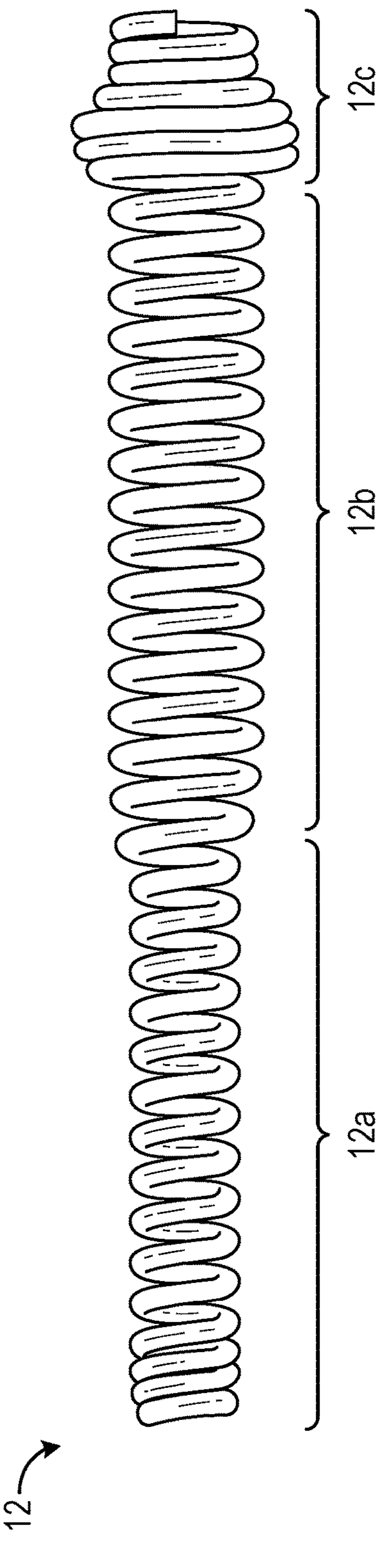
FIG. 2 is a conceptual side view showing a micro-spring of the writing tip assembly of FIG. 1.

FIG. 2 is a conceptual side view showing the micro-spring 12 of the writing tip assembly 10 of FIG. 1. The micro-spring 12, in addition to biasing the second ball 16 toward the writing ball 14, may also act as a flow medium for ink. For example, ink may flow along or within the interstices of the micro-spring 12, and a separate flow regulator along the length of the micro-spring 12 may not be necessary. In aspects, the micro-spring 12 includes a first spring portion **12*a* adjacent the second ball 16 and a second spring portion 12*b* extending away from the first spring portion 12*a*. The first spring portion 12*a* may have a smaller diameter than the second spring portion 12*b*. In some aspects, the first spring portion 12*a* has a smaller diameter than the second ball 16. In some aspects, the second spring portion 12*b* has a greater diameter than the second ball 16**.

In aspects, the micro-spring 12 further includes a third spring portion **12*c*. The second spring portion 12*b* may be between the first spring portion 12*a* and the third spring portion 12*c*. The second spring portion 12*b* may have a smaller diameter than that of the third spring portion 12*c*. In some aspects, the third spring portion 12*c* has a smaller length than that of the second spring portion 12*b*. In aspects, providing succeeding narrow diameters to sections of the micro-spring 12 in a direction toward the writing ball may promote uniform flow of ink along the interstices of the micro-spring 12**.

The micro-spring 12 with more than one spring portions may be unitary, for example, integrally formed. In some aspects, different spring portions may be welded to form the micro-spring 12.

In aspects, the writing tip assembly further includes a tip body 18 defining a lumen 20. The tip body 18 may be unitary, for example, integrally formed. The writing ball 14 may be confined to a space defined by the top body 18. In aspects, about 70% of the writing ball 14 may be covered by the tip body 18, with a remaining portion protruding out from the tip body and available to contact a writing substrate.

Figure 3:
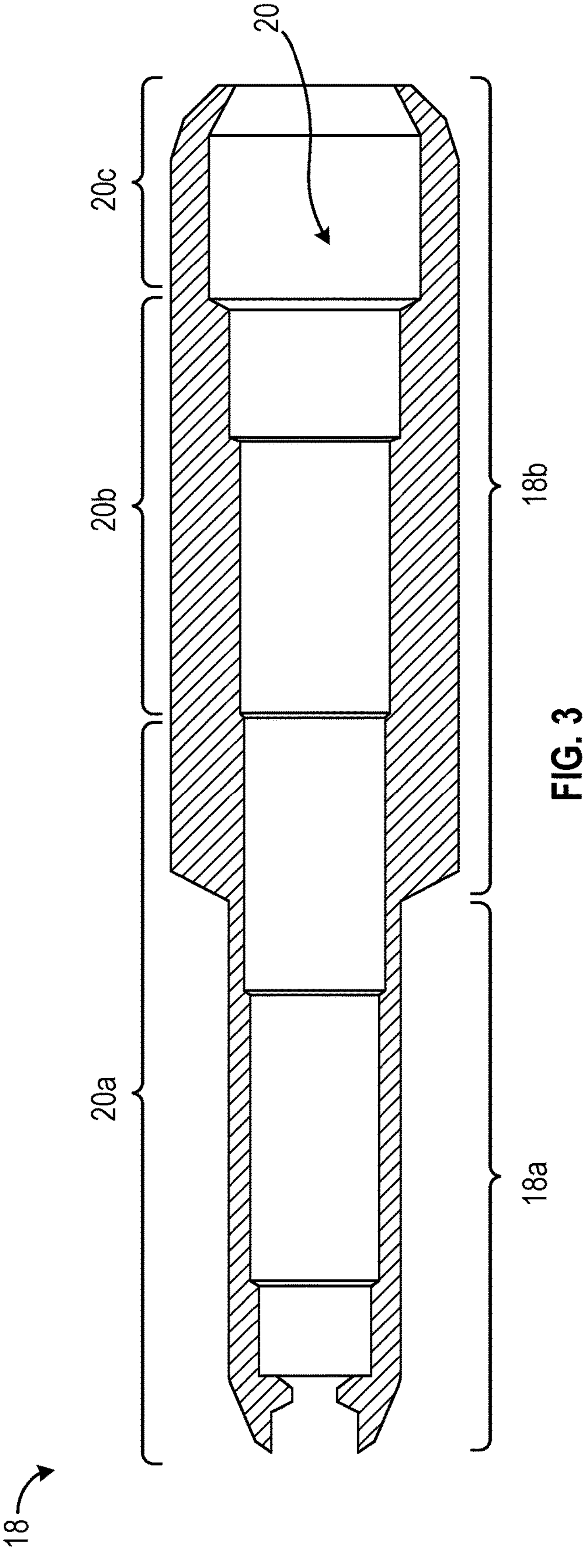
FIG. 3 is a conceptual cross-sectional view showing a tip body of the writing tip assembly of FIG. 1.

FIG. 3 is a conceptual cross-sectional view showing the tip body 18 of the writing tip assembly of FIG. 1. In aspects, the tip body 18 includes a ball section **18*a* housing the writing ball 14, the second ball 16, and a tip portion of the micro-spring 12. For example, the tip portion of the micro-spring may be a portion of the first spring section 12*a*. In some aspects, the tip body 18 includes a spring section 18*b* extending away from the ball section 18*b* and housing a remaining portion of the micro-spring 12. In some such aspects, the spring section 18*b* has a maximum wall thickness greater than that of the ball section 18*a*. In some aspects, the spring section 18*b* has a maximum outer diameter greater than that of the ball section 18*a*. In some aspects, the micro-spring 12 is locked at an end of the tip body 18** by a technique known as "spinning."

The end of the micro-spring 12 secured to the tip body 18 (for example, an end of the third spring section **12*c*) is locked by a bend of the material of the tip body 18 circumferentially inward toward the axis or center of the writing tip assembly 10. The last few coils, for example, the last two coils, of the micro-spring 12, which may have a smaller diameter than the rest of the micro-spring 12 or of the third spring section 12*c*, protrudes out of the tip body 18, to provide surface contact with a feeder, as described with reference to FIGS. 4A to 4**C.

The micro-spring 12, in compression, tends to push the second ball 16 to move toward the writing ball 14, which in turn tends to push the writing ball 14. In this way, the writing ball 14 seals the writing end of the tip body 18. For example, the surface of the writing ball 14 makes a seal contact with the tip body 18, thereby acting as a non-return valve mechanism. The second ball 16 and the micro-spring 12 realigns the writing ball 14, maintaining the seal.

Additionally, better lubrication or smoothness in writing may be provided, by smoother ball. For example, when the writing pressure is higher, the second ball 16 gets loaded in the broach 22 area resulting with more friction, reducing the tendency of writing ball rotation. However, the combination of the micro-spring force, point-to-point contact, and lubrication behavior present in the low viscous fluid ultimately provides smoother writing. The parameters may be adjusted to improve writing smoothness.

Ink gets filled in a hollow portion of the tip body adjacent the writing ball 14. Then the ink flows via the broach 22 of the writing tip assembly 10, filling an ink well formed adjacent the writing ball 14. When the writing ball 14 is rotated/displaced, ink flows out of the writing tip assembly 10 and runs as the writing ball 14 guides.

In some aspects, the writing tip assembly 10 has a diameter of 1.60 mm, and length of 8 mm. The writing ball 14 may have a diameter of 0.50 mm, locked at the front end of the tip, but able to freely rotate upon writing. The inner diameter of the tip body 18 adjacent the second ball 16 may have a diameter of 0.60 mm. The second ball 16 may have a diameter of 0.60 mm. The micro-spring 12 may be of 8 mm free uncompressed length with varying diameters. The rear end of the micro-spring 12 may have a larger diameter of 1.16 mm next to a section of 0.72 mm. Another section of 0.72 mm coil diameter may protrude out of the tip body to a length of 0.25 mm from the rear end of the tip that makes surface contact with the feeder 104. The larger coil diameter of the spring 1.16 mm may be locked inside the tip by a method called "spinning."

Spinning is a method of locking the micro-spring 12 onto the tip body 18 by bending the material of the tip body 18 at an end to a diameter lesser than the maximum diameter of the micro-spring 12. In some aspects, spinning includes bending the material to an included angle of 100° and a bent inner diameter of 1.05 mm, which is 0.10 mm lesser than the maximum spring dimension. In some aspects, the number of coils in the micro-spring 12 is 25, in which upon compression the pitch of the spring becomes negligible and acts an ink-guiding member. Using capillary action phenomenon, the ink passes from the feeder to the writing ball with the aid of the micro-spring 12.

The lumen 20 may at least partially house the micro-spring 12. For example, an end or a portion of the micro-sprint 12 may protrude or extend beyond the lumen 20. In the embodiment shown in FIG. 1, a portion of the third spring portion 12*c* extends beyond the lumen 20. In some aspects, the lumen 20 substantially completely houses the micro-spring 20.

The lumen 20 may completely house the second ball 16. In some aspects, the lumen 20 at least partially houses the writing ball 14. For example, a rolling portion of the writing ball 14 may extend out from the lumen 20 to contact a substrate to leave a mark or an impression by transferring ink to the substrate.

The lumen 20 may have a substantially constant inner diameter along an entire length of the lumen 20. In some aspects, the lumen 20 may include different sections of different inner diameters along the length of the lumen 20. In some aspects, the lumen 20 defines a first lumen section 20*a*, a second lumen section 20*b* having a maximum diameter greater than that of the first lumen section 20*a*, and a third lumen section 20*c* having a maximum diameter greater than that of the second lumen section 20*b*. Providing different diameters to different sections of the lumen 20 may accommodate and retain different sections of the micro-spring 12 that may have different diameters. For example, a section of the micro-spring 12 having a larger maximum diameter may be constrained or restricted from moving longitudinally into a section of the lumen 20 having a smaller maximum inner diameter. The respective diameters of the sections of the micro-spring 12 and/or the lumen 20 may vary along their respective lengths.

In aspects, the tip body 18 defines a broach 22 between the writing ball 14 and the second ball 16. The broach 22 may be integrally formed with or unitary with the tip body, or may be formed as a distinct element, for example, a collar or a gasket. In some aspects, the broach 22 may be star-shaped.

The second ball 16 may be held between the broach 22 and the micro-spring 12. The broach 22 may defines an ink aperture 24 fluidically coupled to the lumen 20, or constituting a neck or a narrowed section of the lumen 20. Thus, the broach 22 may be disposed with the lumen 20, or toward or near a writing end of the lumen 20, or substantially at the writing end of the lumen 20. The broach 22 may be in the form of a collar about an inner surface of the lumen 20, which may help retain the second ball 16 within the lumen 20, by resisting or preventing a migration or movement of the second ball 16 beyond an end of the lumen 20. The micro-spring 12 may bias the second ball 16 against the broach 22, and ultimately, in sufficient proximity to or in contact with the writing ball 14 so that ink about the second ball may be transferred across the broach 22 to the writing ball 14.

One or more of the micro-spring 12, the writing ball 14, the second ball 16, or the tip body 18 may include, consist of, or consist essentially of, a metal, an alloy, a ceramic, a glass, a plastic, or any other suitable rigid material or combinations thereof.

Examples of writing instruments including the writing tip assembly 10 are described with reference to FIGS. 4A to 4C. However, the writing tip assembly 10 described with reference to FIGS. 1 to 3 may be used in any suitable writing instrument. Further, any suitable writing tip assembly according to the present disclosure may be used in writing instruments described with reference to FIGS. 4A to 4C.

Figure 4A:
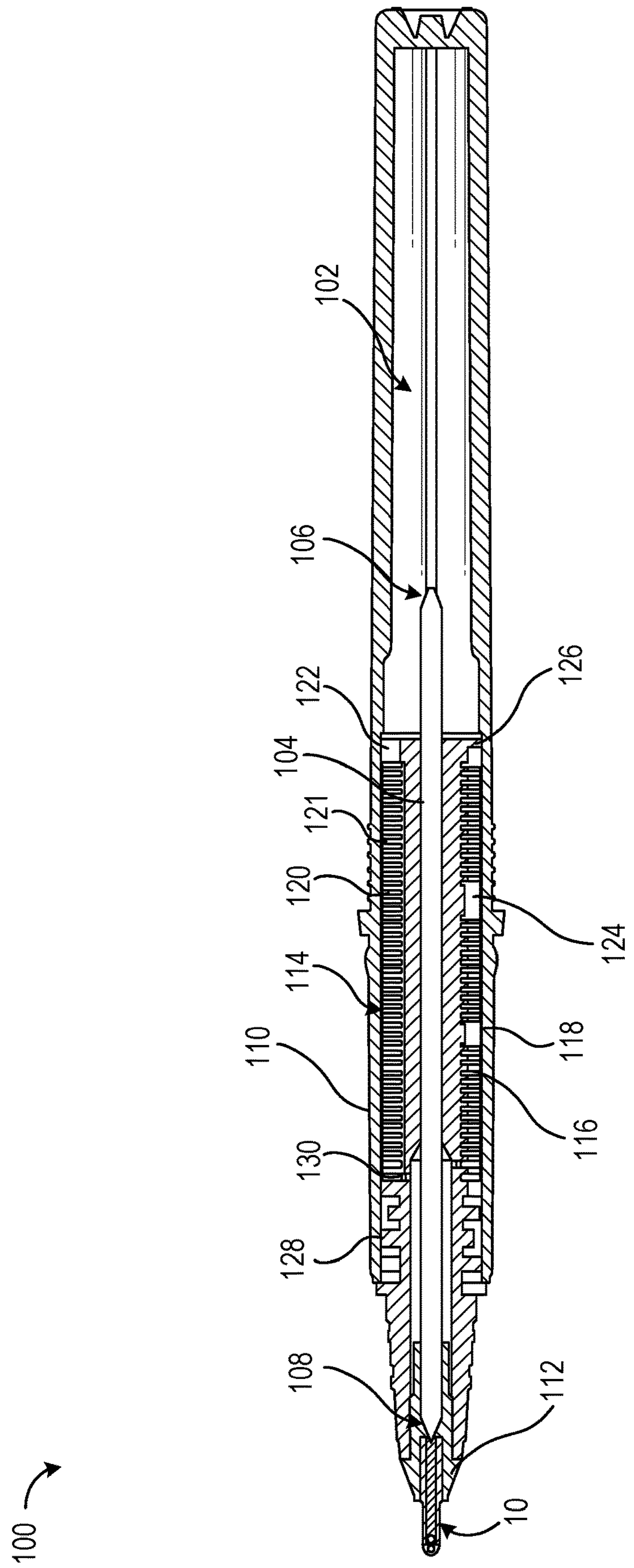
FIG. 4A is a conceptual cross-sectional view of a writing instrument including the writing tip assembly of FIG. 1.
Figure 4B:
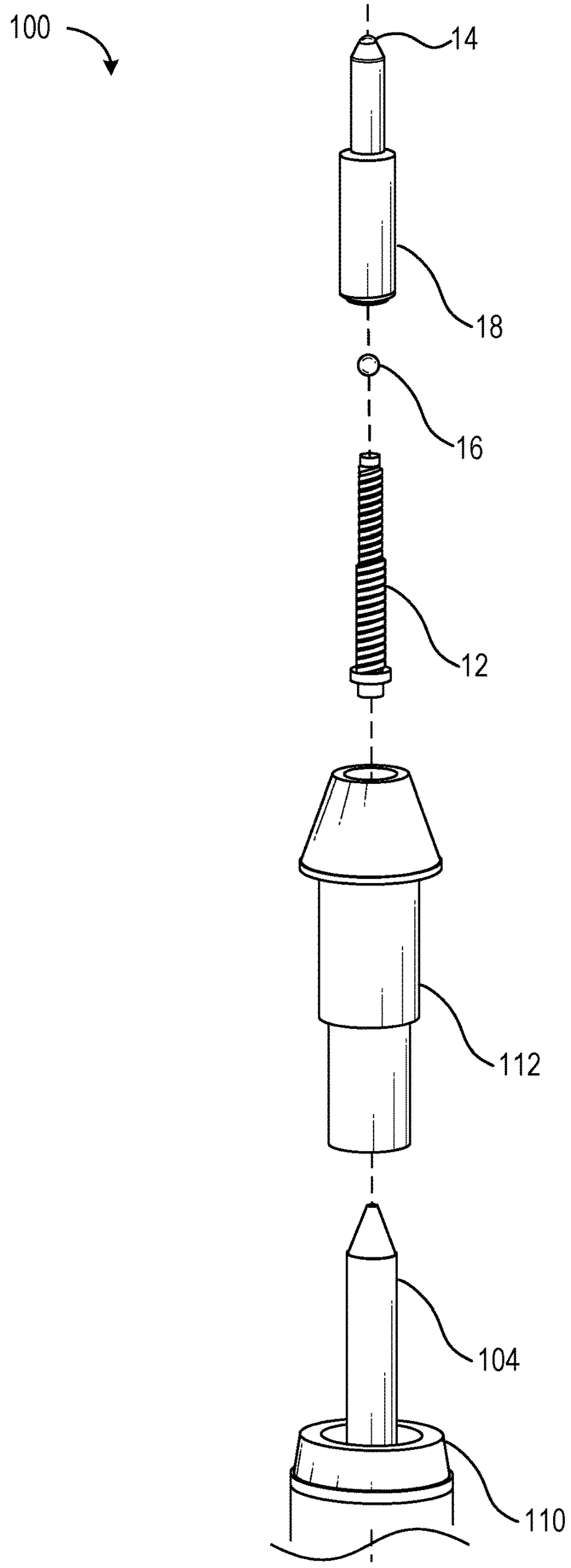
FIG. 4B is a conceptual partial exploded view of the writing instrument of FIG. 4A.
Figure 4C:
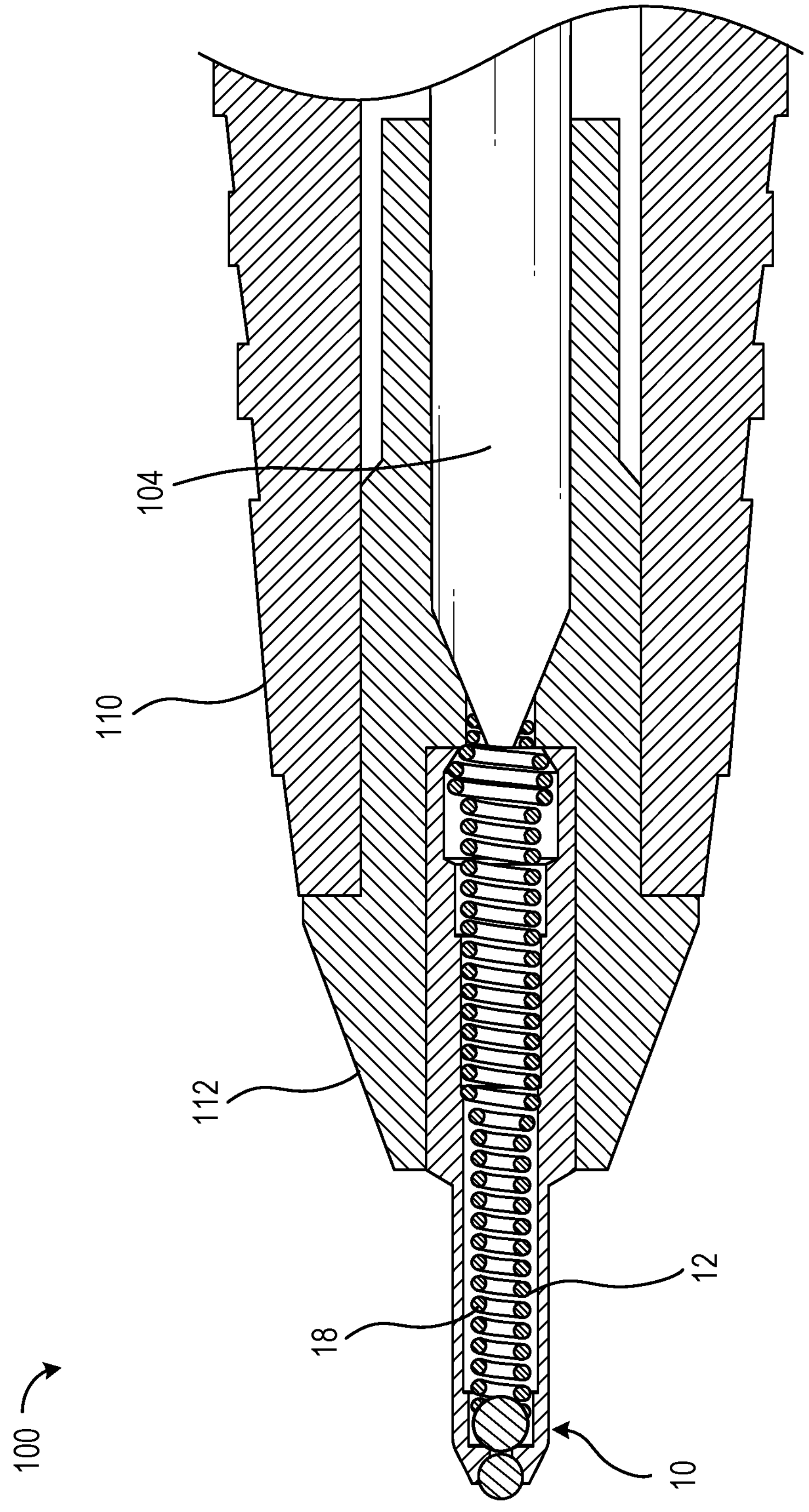
FIG. 4C is a conceptual partial cross-sectional view of the writing instrument of FIG. 4A.

FIG. 4A is a conceptual cross-sectional view of a writing instrument including the writing tip assembly 10 of FIG. 1. FIG. 4B is a conceptual partial exploded view of the writing instrument 100 of FIG. 4A. FIG. 4C is a conceptual partial cross-sectional view of the writing instrument 100 of FIG. 4A.

The writing instrument 100 may dispense a free-flowing low-viscosity ink. The writing instrument includes an ink reservoir 102 for containing the ink. The writing instrument 100 may further include a feeder 104 fluidically coupling the ink reservoir 102 to the writing tip assembly 10. The feeder 104 may include a plurality of porous fibers (for example, packed together as a bundle), and act as ink transfer member and to control the ink flow between the ink reservoir 102 and the writing tip assembly 10. A portion of the feeder 104 may be immersed into ink in the ink reservoir 102 to help in better transfer of ink into the feeder 104. The feeder 104 may thus include a fibrous substrate to promote regulated or controlled flow of ink from the reservoir along the feeder 104 toward the writing tip assembly 10. In aspects, a maximum diameter of the micro-spring 12 is less than that of the feeder 104. Providing a lower maximum diameter to the micro-spring 12 than that of the feeder 104 may allow the micro-spring 12 to transfer ink uniformly from the feeder 104 to the writing ball 14.

The feeder 104 makes a surface contact with the micro-spring 12, for example, at the coil turns protruding out of the tip body 18. Ink transfer occurs via surface contact of the micro-spring 12 and the feeder 104. The coil pitch of the spring 12 may be selected such that the compressed gap between coils is relatively very low, for example sufficiently low to sustain a capillary flow of ink along interstices between the coils.

The feeder 104 may extend from a reservoir end 106 to a tip end 108. The reservoir end 106 may be at least partially inserted or in contact with ink in the reservoir 102. The tip end 108 may contact an end of the micro-spring 12, or otherwise an end of the lumen 20, so that ink from the reservoir 102 ultimately flows through the feeder 104, and through the lumen 20 (for example, along the micro-spring 12), toward the writing ball 14. For example, interstices between adjacent coils of the micro-spring 12 may define a capillary flow path for ink to flow from the ink reservoir 102 through the feeder 104 and the tip assembly 10 to the writing ball 14.

The writing instrument 100 includes an instrument body 110 that defines the reservoir 102, and that houses or holds components of the writing instrument 100. The instrument body 110 may include a plastic, a metal, an alloy, a ceramic, or combinations thereof. The instrument body 110 may include transparent or translucent sections, or be transparent or translucent in entirety.

In some aspects, the ink reservoir 102 is filled with about 1.5 g ink having a very low viscosity of 1.5 to 60 mPa-s at room temperature. The lamella 114, the adaptor 112, and the feeder 104 may be assembled with the writing tip assembly 10 having flow characteristics matched with the flow parameters of the low viscous ink used in the writing instrument 100.

In some aspects, the writing instrument substantially no leakage at up to 0.5 bar of vacuum pressure, either at the lamella 114 or at the writing tip assembly 10.

In aspects, the writing instrument 100 further includes an adapter 112 holding the tip assembly 10 adjacent the feeder 104. For example, the adapter 112 may be secured at or at least partially within the instrument body 110 adjacent a writing end. The adapter 112 may include one or more cylindrical portions extending within the instrument body 110, and a conical portion extend outside the instrument body 110.

In aspects, the writing instrument 100 further includes a lamella 114 extending from the writing tip assembly 10 into the ink reservoir 102. The lamella 114 may include a plurality of ribs or fins 116 circumferentially mounted over (or integrally extending from) a cylinder 118 in equal intervals of space between one another.

Ink flow and airflow are two flows that play a role in pressure regulation. The pressure of the ink inside the ink reservoir 102 must substantially be equal to the ambient pressure, to avoid leakage. The lamella 114 facilitates pressure regulation.

The ink inside the ink reservoir 102 flows through the feeder 104 by capillary action in which the feeder 104 transfers the ink to the writing tip assembly 10. A portion of the ink reservoir 102 is disposed around the periphery of the lamella 114. The lamella 114 defines a number of types of grooves. For example, ink reserve circumferential grooves 120 formed by the gaps between the fins 116 may store ink temporarily. Air exchange grooves 121 or an ink guide groove 122 may act as a guide for ink flow to the circumferential ink reserve grooves 120. A long groove that may be comparatively wider than the ink guide groove 122 is the ink reserve groove or airflow groove 124. Both the grooves 122 and 124 may communicate with one another with the help of the equally spaced circumferential grooves 120.

When the pressure inside the ink reservoir 102 increases relative to the atmospheric pressure either by increasing the temperature of the ink or by reducing the pressure outside the pen, the ink inside the ink reservoir 102 is conducted with the help of air exchanging groove 122 into the circumferential grooves 120 by displacing the air out which is present in the circumferential grooves 120. The ink is guided by the ink guide groove 121 into the circumferential groove to the ink reserve groove 124.

The pressure inside the ink reservoir 102 may get reduced, either by writing during which ink is released via the feeder 104, by increasing the pressure outside the pen, or by lowering the temperature of the ink. In this case, the air present outside the system flows into the ink reservoir 102 where the ink is present in order to obtain equilibrium condition. The air exchange groove 122 is a groove where the lamella 114 and the ink reservoir 102 can communicate with one another so that the pressure inside the ink reservoir 102 gets regulated.

Airflow occurs in the lamella 114 with the outside environment using an air inlet hole. For example, air flows along the grooves 124 present in between the fins 116 reaching the air flow groove 121. Then the air flow groove 121 communicates with the air exchange grooves 122 via the circumferential fins 116 thereby regulating the pressure inside the ink reservoir 102.

The air exchanging portion of the air exchange grooves 122 is the member made in order to exchange the air between the ink reservoir 102 and the lamella 114. A larger fin 126 may act as a bottom seal member, having an interference fit with the ink reservoir 102 circumferentially, so that the ink stored in the ink reservoir 120 will not be able to leak or escape into the lamella 114.

One or more forward fins 128 communicate the air supply with outer environment or atmosphere and create a seal along inner walls of the ink reservoir 102, providing regulated airflow.

The lamella 114 defines a through-hole through which the feeder 104 extends. Two air holes 130 (for example, square holes) of a relatively small size may be defined in the lamella 114, for communicating the airflow between the inside of the lamella 114 and the fins.

The air holes 130 maintain pressure equilibrium inside the lamella 114 to the circumferential fins 116, helping in preventing tip leakage due to the increase in pressure in the feeder 104 present inside the lamella 114. In this way, the lamella 114 may regulate pressure differences and provide a stable ink supply from the ink reservoir 102 to the writing tip assembly 10.

Writing tip assemblies and writing instruments according to the present disclosure may substantially resist or avoid general issues such as feathering, skip writing, goofing, and blobbing. For example, the micro-spring system provides continuous ink flow, constant discharge with the help of the feeder. The writing ball may act as a closing member to seal the flow area whenever writing pressure is removed, reducing or avoiding excess flow of the ink outside the tip assembly, which in turn avoids goofing. The continuous and constant discharge of the ink avoids feathering or skip writing issues.

Writing tip assemblies and writing instruments according to the present disclosure may provide advantages such as the following. (1) No tip leakage, even with low viscosity ink. The double ball spring-loaded assembly moves the ball toward the seat and create a seal at idle condition, which may control tip leak even at extreme environment conditions such as high temperature/humidity or low pressure. (2) Capillary action: the micro-spring inside the tip body makes surface contact with the feeder outside the tip serving as a path/guide for the ink and enhancing the ink flow using capillary action. (3) Smooth writing: the micro-spring double ball system provides better cushioning effect to the writing ball, providing very smooth writing feel and supports lubrication for the tip rotation in free flow system pen. (4) Writing parameters: feather, smudge and skip writing issues may be reduced or prevented, for example, completely avoided, with the aid of spring action in free flow system pen.

EXAMPLES

Example 1

Writing tests were performed using an auto-writing machine. A writing distance of about 1000 did not exhibit any writing issues, standard temperature and pressure (STP) conditions.

Example 2

Writing smoothness was measured. Writing smoothness is termed as the smoothness or effortless writing nature felt by the user of the pen. It can be measured in terms of the writing feel gauged by a user in the scale of 1 to 10. The higher number represents a poor or scratchy writing feel and the lower number represents smooth and effortless writing. Based on a survey taken with group of 100 peoples, a free-flow writing instrument with a micro-spring double-ball tip had a rating of 1 to 4, with the frequency of ratings 1 and 2 around 45 percent, which enumerates the smooth writing flow. The cushioning behavior provided by the micro-spring aids the lubrication and smooth writing feel of the free-flow writing instrument.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments.

What is claimed is:

1. A writing tip assembly for dispensing a free-flowing low-viscosity ink from a writing instrument, the writing tip assembly comprising:

a micro-spring, a tip body defining a lumen at least partially housing the micro-spring, a writing ball configured to transfer ink to a substrate, wherein at least 70% of the writing ball is covered by the tip body, and a second ball between the writing ball and the micro-spring, wherein the second ball is configured to transfer ink to the writing ball;

wherein the micro-spring comprises a first spring portion adjacent the second ball, a second spring portion extending from the first spring portion, a third spring portion extending from the second spring portion, and a fourth spring portion extending from the third spring portion and extending beyond the lumen;

wherein the second spring portion has a smaller diameter than that of the third spring portion, the third spring portion has a greater diameter than that of the second spring portion, and the fourth spring portion has a diameter equal to that of the second spring portion; and wherein the writing instrument comprises a feeder configured to provide ink from an ink reservoir to the writing tip assembly via contact between the feeder and fourth spring portion.

2. The writing tip assembly of claim 1, wherein the second ball has a diameter greater than that of the writing ball.

3. The writing tip assembly of claim 1, wherein the first spring portion has a smaller diameter than that of the second ball.

4. The writing tip assembly of claim 1, wherein the second spring portion has a greater diameter than that of the second ball.

5. The writing tip assembly of claim 1, wherein the micro-spring is unitary.

6. The writing tip assembly of claim 1, wherein the third spring portion has a smaller length than that of the second spring portion.

7. The writing tip assembly of claim 1, wherein the lumen houses the second ball.

8. The writing tip assembly of claim 1, wherein the tip body defines a broach between the writing ball and the second ball, wherein the second ball is held between the broach and the micro-spring, and wherein the broach defines an ink aperture fluidically coupled to the lumen.

9. The writing tip assembly of claim 1, wherein the lumen defines a first lumen section, a second lumen section having a maximum diameter greater than that of the first lumen section, and a third lumen section having a maximum diameter greater than that of the second lumen section.

10. The writing tip assembly of claim 1, wherein the tip body comprises a ball section housing the writing ball, the second ball, and a tip portion of the micro-spring, wherein the tip body comprises a spring section extending away from the ball section and housing a remaining portion of the micro-spring, and wherein the spring section has a maximum wall thickness greater than that of the ball section.

11. The writing tip assembly of claim 10, wherein the spring section has a maximum outer diameter greater than that of the ball section.

12. The writing tip assembly of claim 1, wherein the tip body is unitary.

13. The writing tip assembly of claim 1, wherein the tip body comprises a metal or an alloy.

14. The writing tip assembly of claim 1, wherein one or more of the writing ball, the second ball, or the micro-spring comprises a metal or an alloy.

15. A writing instrument for dispensing a free-flowing low-viscosity ink, the writing instrument comprising:

an ink reservoir;

a writing tip assembly comprising:

a tip body defining a lumen; and a micro-spring at least partially disposed within the lumen;

a lamella extending from the writing tip assembly into the ink reservoir, the lamella comprising:

a plurality of fins, wherein a larger fin is disposed at the bottom of the lamella such that the fin creates a bottom seal between the lamella and the ink reservoir; and two air holes configured to facilitate airflow between the inside of the lamella and the plurality of fins; and a feeder fluidically coupling the ink reservoir to the micro-spring of the writing tip assembly;

wherein the feeder contacts a portion of the micro-spring extends beyond the lumen; and wherein a feeder end of the tip body is bent inward at least at a 100° angle to secure the micro-spring within the tip body, such that a bent inner diameter of the tip body is less than a maximum diameter of the micro-spring at the feeder end.

16. The writing instrument of claim 15, wherein a maximum diameter of the micro-spring is less than that of the feeder.

17. The writing instrument of claim 15, wherein interstices between adjacent coils of the micro-spring define a capillary flow path for ink to flow from the ink reservoir through the feeder and the tip assembly to the writing ball.

18. The writing instrument of claim 15, further comprising an adapter holding the tip assembly adjacent the feeder.

* * * * *